May 28, 1929.   C. P. DUBBS   1,715,062
LIQUID LEVEL GAUGE FOR LIQUIDS UNDER HIGH PRESSURE AND TEMPERATURE
Filed Sept. 6, 1921
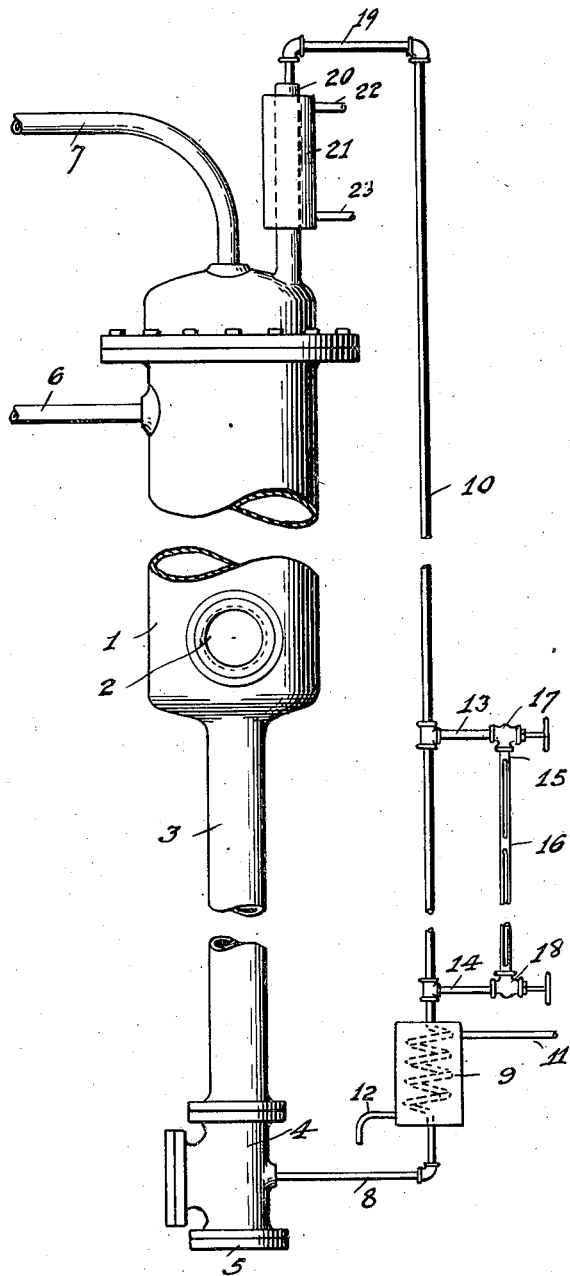
Witness,
Inventor,
Carbon P. Dubbs Patented May 28, 1929.

1,715,062

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

LIQUID-LEVEL GAUGE FOR LIQUIDS UNDER HIGH PRESSURE AND TEMPERATURE.

Application filed September 6, 1921. Serial No. 498,885.

This invention relates to improvements in a liquid level gauge for liquids under high pressure and temperature and refers more particularly to an apparatus for ascertaining the liquid level in the stand pipe or upright reservoir wherein a heated liquid is maintained.

Among the salient objects of the invention are to provide a device which accurately indicates the liquid level contained in the reservoir tank or container in spite of any pressure which is imposed upon the liquid; to provide a device in which the liquid in the gauge is cooled to an extent where any local circulation is obviated tending to more accurately register the proper height of the liquid which is being gauged; to provide a device which is particularly adapted to oil cracking apparatus wherein the heated oil is maintained under considerable pressure with generated vapors.

The single figure is a side elevation of a portion of the oil apparatus, showing the gauge in position on the dephlegmator.

Referring to the drawings—the dephlegmator 1 is of the vertical type connected to the vapor chamber (not shown) of the cracking apparatus through the connection 2 through which the vapors are introduced to the dephlegmator. In the lower leg 3 of the dephlegmator is collected the reflux condensate separated from the vapors during the dephlegmating action. To the lower extremity of this dephlegmator leg is connected a T-connection 4 having a lower flange connection 5 through which a liquid draw-off may be connected for relieving the dephlegmator of this condensate. The uncondensed vapors are drawn off through the upper vapor lines 6 and 7. The dephlegmator explained is of a common type used in cracking apparatus and has no part in the present invention. The device hereinafter explained is the liquid level gauge for indicating at all times the liquid level of the reflux condensate contained in the dephlegmator.

A lower connecting line 8 communicates with the T-connection 4 and also with the condenser coil 9 which cools the hot oil which rises into the vertical pipe 10 of the gauge. Water inlet and outlet pipes 11 and 12 circulate cooling water about the condenser coil. To the vertical line 10 are connected secondary lines 13 and 14 which have positioned therebetween a gauge glass 15 positioned within an armored case 16. The valves 17 and 18 are positioned at each end of the gauge glass. The upper extension of the vertical line 10 communicates through a line 19 with the condenser pipe 20 which is cooled by a condenser box 21 through which a cooling medium, such as water or cool oil, is circulated through the pipes 22 and 23. The condenser pipe 20 is connected directly with the top of the dephlegmator 1 and permits the vapors, which rise in the dephlegmator, to pass off and be cooled prior to their admission to the equalizing pressure line 10.

The function of the upper condenser is to relieve the vapors of a substantial part of their condensable fractions, permitting substantially only the uncondensable gases to pass over to equalize the pressure in the gauging apparatus. Heretofore, where the vapors were passed over directly as an equalizing medium, there would be a considerable amount of condensation in the pressure equalizing pipe and due to this collection of liquid in the pipe there would be a consequent minor circulation of the oil in the gauging apparatus. In other words, the gauging device, which was to function as a liquid level gauge, would operate somewhat as a dephlegmator and considerable condensation take place in the pressure equalizing portion of the vertical line 10. For these reasons there could be no accurate indication of the liquid level in the gauge glass and the reliability of the device was always open to considerable question.

As the liquid levels maintained in different portions of the apparatus are important features in connection with the operation of the process, it is essential that some accurate device be available to indicate these liquid levels. By interposing a condenser for relieving the equalizing vapor pressure of its condensable fractions this difficulty is to a great extent obviated and a very accurate indication of the level obtained at all times.

This apparatus, while particularly adapted to an oil cracking system, is equally as adaptable to other types of processes in which liquids are treated at high temperatures and under high pressure.

I claim as my invention:—

1. A liquid level gauge comprising an elongated vertical standpipe formed with a cooling coil near its lower end, a liquid conveying pipe connecting the lower portion of a fluid receptacle to be gauged with the standpipe at a point below said cooling coil, a vapor conveying line connecting the upper end of the standpipe with the receptacle for equalizing the pressure therein, condensing means interposed in said vapor pressure equalizing line adapted to separate the condensable vapors from the gaseous matter serving as an equalizing medium, a gauge glass and tubular means for connecting said gauge glass with said standpipe above and below the liquid level normally maintained in said fluid receptacle.

2. A liquid level gauge for heated liquids maintained under a pressure of generated vapors and uncondensable gases in a containing vessel, comprising a standpipe arranged in parallel relation with, but spaced from, said containing vessel, a gauge glass connected with said standpipe above and below the liquid level normally maintained in said fluid receptacle, means connecting said standpipe with said containing vessel below the liquid level maintained in said vessel, a second means connecting said standpipe with said containing vessel above the liquid level maintained therein, means for cooling liquid passing through said first connecting means, means for condensing the condensable vapors entering said second connecting means, whereby only uncondensable gas and relatively cool liquid are admitted to said standpipe.

CARBON P. DUBBS.